US012654701B2

(12) United States Patent
Wassef et al.

(10) Patent No.: US 12,654,701 B2
(45) Date of Patent: Jun. 16, 2026

(54) LIMITING VEHICLE ACCELERATION DURING TURNS

(71) Applicant: GM GLOBAL TECHNOLOGY OPERATIONS LLC, Detroit, MI (US)

(72) Inventors: Andrew Wassef, Novi, MI (US); Kevin A. O'Dea, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 77 days.

(21) Appl. No.: 18/656,802

(22) Filed: May 7, 2024

(65) Prior Publication Data

US 2025/0346229 A1    Nov. 13, 2025

(51) Int. Cl.
*B60W 40/107* (2012.01)
*B60W 30/16* (2020.01)
*B60W 30/18* (2012.01)
*B60W 40/105* (2012.01)

(52) U.S. Cl.
CPC ...... *B60W 30/16* (2013.01); *B60W 30/18145* (2013.01); *B60W 40/105* (2013.01); *B60W 40/107* (2013.01); *B60W 2540/20* (2013.01); *B60W 2552/30* (2020.02); *B60W 2554/4042* (2020.02); *B60W 2554/802* (2020.02); *B60W 2556/40* (2020.02); *B60W 2720/106* (2013.01)

(58) Field of Classification Search
CPC ........... B60W 30/16; B60W 30/18145; B60W 40/105; B60W 40/107; B60W 2556/40; B60W 2554/4042; B60W 2552/30; B60W 2554/802; B60W 2540/20; B60W 2720/106
See application file for complete search history.

(56) References Cited

U.S. PATENT DOCUMENTS

| | | |
|---|---|---|
| 8,326,512 B2 | 12/2012 | Klotz et al. |
| 8,447,488 B2 | 5/2013 | Hellmann et al. |
| 12,077,156 B2 | 9/2024 | Lewandowski et al. |
| 12,319,287 B2 * | 6/2025 | Kadoya .............. B60W 30/143 |
| 2022/0105940 A1 * | 4/2022 | Hartnett ............ B60W 60/0011 |

FOREIGN PATENT DOCUMENTS

| | | | |
|---|---|---|---|
| DE | 102020004196 A1 | 11/2020 | |
| DE | 102021133739 A1 * | 9/2022 | .......... B60W 30/146 |
| JP | WO2017145555 A1 * | 11/2018 | ...... B60W 30/18145 |

OTHER PUBLICATIONS

German Office Action for German Application No. 102024118894. 4; dated Apr. 15, 2025; 6 pages.

* cited by examiner

*Primary Examiner* — Peter D Nolan
*Assistant Examiner* — Matthew Cobb
(74) *Attorney, Agent, or Firm* — CANTOR COLBURN LLP

(57) ABSTRACT

Examples described herein provide a method for limiting vehicle acceleration during turns for a vehicle. The method includes determining whether the vehicle is about to begin a turn before the vehicle begins the turn. The method further includes, responsive to determining that the vehicle is about to begin the turn before the vehicle begins the turn, calculating an acceleration limit for the vehicle during the turn based at least in part on map data associated with the turn. The method further includes controlling the vehicle during the turn based at least in part on the acceleration limit.

20 Claims, 5 Drawing Sheets

LIMITING VEHICLE ACCELERATION DURING TURNS

The subject disclosure relates to vehicles, and in particular to limiting vehicle acceleration during turns.

Modern vehicles (e.g., a car, a motorcycle, a boat, or any other type of automobile) may be equipped with one or more cameras that provide back-up assistance, take images of the vehicle driver to determine driver drowsiness or attentiveness, provide images of the road as the vehicle is traveling for collision avoidance purposes, and provide structure recognition (e.g., roadway signs, etc.). For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

Such vehicles can also be equipped with sensors such as a radar device(s), LiDAR device(s), and/or the like for perception tasks. LiDAR involves using light (e.g., a pulsed laser) to measure distance to objects by emitting laser pulses, detecting a reflection (e.g., off of an object) of the emitted laser pulse, and measuring the time between the emission and the detection. The measured time can be used to determine the distance between the LiDAR device and the detected object. Perception tasks can include one or more of object detection, classification, tracking, lane detection, road sign recognition, and obstacle avoidance. Perception tasks are particularly useful for an autonomous vehicle to provide the autonomous vehicle with real-time awareness of its environment to make safe and informed driving decisions. Images from the one or more cameras of the vehicle can also be used for detecting objects, tracking targets, and/or the like, including combinations and/or multiples thereof.

SUMMARY

In one embodiment, a method for limiting vehicle acceleration during turns for a vehicle is provided. The method includes determining whether the vehicle is about to begin a turn before the vehicle begins the turn. The method further includes, responsive to determining that the vehicle is about to begin the turn before the vehicle begins the turn, calculating an acceleration limit for the vehicle during the turn based at least in part on map data associated with the turn. The method further includes controlling the vehicle during the turn based at least in part on the acceleration limit.

In addition to one or more of the features described herein, or as an alternative, further embodiments of the method may include determining whether a turn signal of the vehicle is engaged, and responsive to determining that the turn signal of the vehicle is engaged, modifying the acceleration limit for the vehicle by reducing the acceleration limit.

In addition to one or more of the features described herein, or as an alternative, further embodiments of the method may include determining whether a turn signal of the vehicle is engaged, responsive to determining that the turn signal of the vehicle is engaged, implementing the acceleration limit for the vehicle during the turn, and responsive to determining that the turn signal of the vehicle is not engaged, resetting the acceleration limit for the vehicle to a default acceleration limit.

In addition to one or more of the features described herein, or as an alternative, further embodiments of the method may include determining whether a target vehicle is in proximity to the vehicle and in front of the vehicle, and responsive to determining that the target vehicle is in proximity to the vehicle and in front of the vehicle, modifying the acceleration limit for the vehicle by reducing the acceleration limit based at least in part on a distance to the target vehicle and a speed of the target vehicle.

In addition to one or more of the features described herein, or as an alternative, further embodiments of the method may include, responsive to determining that the target vehicle is in proximity to the vehicle or is not in front of the vehicle, implementing the acceleration limit for the vehicle during the turn.

In addition to one or more of the features described herein, or as an alternative, further embodiments of the method may include determining whether the turn is complete, and responsive to determining that the turn is complete, resetting the acceleration limit for the vehicle to a default acceleration limit.

In addition to one or more of the features described herein, or as an alternative, further embodiments of the method may include that determining whether the turn is complete is based at least in part on movement data received from an inertial measurement unit of the vehicle.

In addition to one or more of the features described herein, or as an alternative, further embodiments of the method may include that the map data indicates a curvature of the turn.

In addition to one or more of the features described herein, or as an alternative, further embodiments of the method may include that calculating the acceleration limit is based at least in part on the curvature of the turn and a square of a velocity of the vehicle.

In addition to one or more of the features described herein, or as an alternative, further embodiments of the method may include, responsive to determining that the vehicle is not about to begin the turn, setting the acceleration limit for the vehicle to a default acceleration limit.

In another embodiment, a vehicle is provided. The vehicle includes an inertial measurement unit to generate movement data for the vehicle and a processing system. The processing system includes a memory having computer readable instructions and a processing device for executing the computer readable instructions. The computer readable instructions control the processing device to perform operations for limiting vehicle acceleration during turns. The operations include determining whether a vehicle is about to begin a turn before the vehicle begins the turn. The operations further include, responsive to determining that the vehicle is about to begin the turn before the vehicle begins the turn, calculating an acceleration limit for the vehicle during the turn based at least in part on map data associated with the turn. The operations further include controlling the vehicle during the turn based at least in part on the acceleration limit. The operations further include determining, based at least in part on the movement data for the vehicle, whether the turn is complete. The operations further include, responsive to determining that the turn is complete, resetting the acceleration limit for the vehicle to a default acceleration limit.

In addition to one or more of the features described herein, or as an alternative, further embodiments of the vehicle may include that the operations further include determining whether a turn signal of the vehicle is engaged, and responsive to determining that the turn signal of the vehicle is engaged, modifying the acceleration limit for the vehicle by reducing the acceleration limit.

In addition to one or more of the features described herein, or as an alternative, further embodiments of the vehicle may include that the operations further include determining whether a turn signal of the vehicle is engaged, responsive to determining that the turn signal of the vehicle is engaged, implementing the acceleration limit for the vehicle during the turn, and responsive to determining that the turn signal of the vehicle is not engaged, resetting the acceleration limit for the vehicle to the default acceleration limit.

In addition to one or more of the features described herein, or as an alternative, further embodiments of the vehicle may include that the operations further include determining whether a target vehicle is in proximity to the vehicle and in front of the vehicle, and responsive to determining that the target vehicle is in proximity to the vehicle and in front of the vehicle, modifying the acceleration limit for the vehicle by reducing the acceleration limit based at least in part on a distance to the target vehicle and a speed of the target vehicle.

In addition to one or more of the features described herein, or as an alternative, further embodiments of the vehicle may include that the operations further include, responsive to determining that the target vehicle is in proximity to the vehicle or is not in front of the vehicle, implementing the acceleration limit for the vehicle during the turn.

In addition to one or more of the features described herein, or as an alternative, further embodiments of the vehicle may include that the map data indicates a curvature of the turn.

In addition to one or more of the features described herein, or as an alternative, further embodiments of the vehicle may include that calculating the acceleration limit is based at least in part on the curvature of the turn and a square of a velocity of the vehicle.

In addition to one or more of the features described herein, or as an alternative, further embodiments of the vehicle may include that the operations further include, responsive to determining that the vehicle is not about to begin the turn, setting the acceleration limit for the vehicle to the default acceleration limit.

In another embodiment a computer program product is provided. The computer program product includes a computer readable storage medium having program instructions embodied therewith, the program instructions executable by at least one processor to cause the at least one processor to perform operations. The operations include determining whether a vehicle is about to begin a turn before the vehicle begins the turn. The operations further include, responsive to determining that the vehicle is about to begin the turn before the vehicle begins the turn, calculating an acceleration limit for the vehicle during the turn based at least in part on map data associated with the turn, the map data indicating a curvature of the turn, the acceleration limit being calculated based at least in part on the curvature of the turn and a square of a velocity of the vehicle. The operations further include controlling the vehicle during the turn based at least in part on the acceleration limit.

In addition to one or more of the features described herein, or as an alternative, further embodiments of the computer program product may include that the operations further include determining, based at least in part on movement data for the vehicle, whether the turn is complete, the movement data being received from an inertial measurement unit of the vehicle, and responsive to determining that the turn is complete, resetting the acceleration limit for the vehicle to a default acceleration limit.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
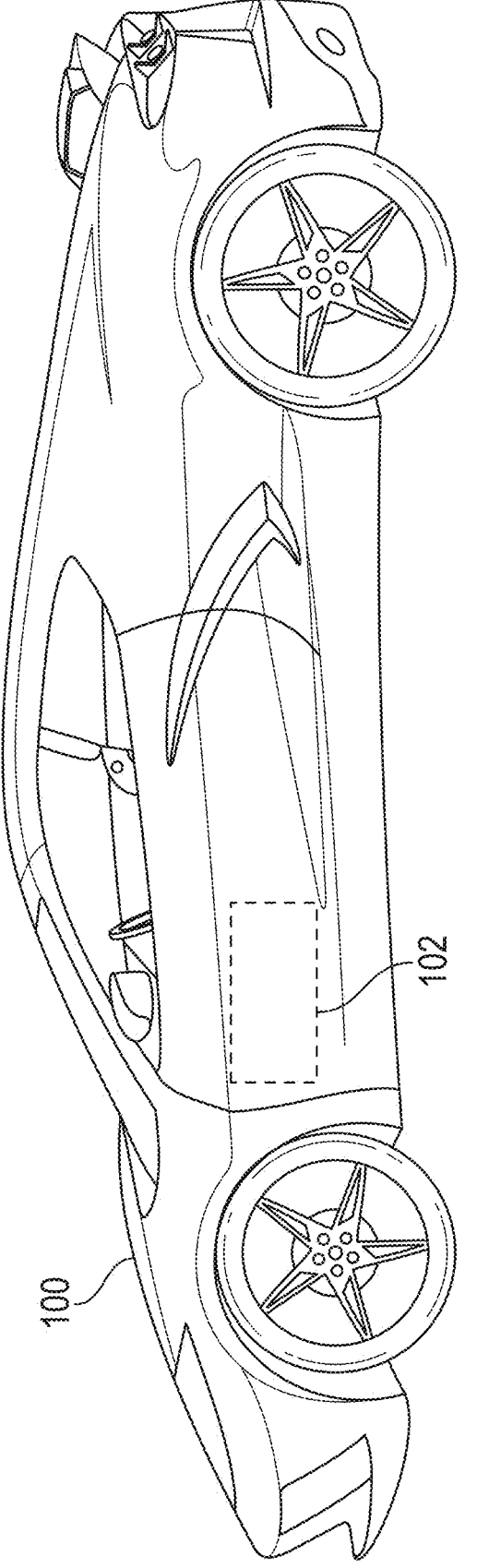
FIG. 1 is an illustration of a vehicle having a processing system for limiting vehicle acceleration during turns according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

One or more embodiments described herein relates to limiting vehicle acceleration during turns.

Vehicles may use advanced driver assistance systems (ADASs) to improve vehicle performance and enhance driving comfort by providing automating, adapting, or enhancing vehicle systems to provide better awareness, decision-making, and control. ADASs often use data from sensors (e.g., RADAR sensors, LiDAR sensor, proximity sensors, etc.), images from cameras, and/or the like, including combinations and/or multiples thereof, to make decisions and control one or more aspects of the vehicle.

One example of an ADAS is adaptive cruise control (ACC), which automatically adjusts the speed of a vehicle to maintain a safe following distance from another vehicle ahead of the vehicle. Traditional cruise control maintains a vehicle's speed but does not adjust the vehicle's speed automatically to account for other vehicles. In contrast, ACC enhances traditional cruise control by automatically adjusting a vehicle's speed to maintain a safe following distance from the vehicle ahead.

ACC works well enough in certain operating conditions (e.g., highway driving at relatively higher speeds) but may not be useful in other operating conditions, such as when a vehicle is turning. For example, when a vehicle is turning, it may be desirable to reduce the vehicle's speed to improve ride comfort and improve vehicle functionality. Although approaches have been implemented to reduce a vehicle's speed responsive to detecting that a vehicle is turning by detecting a change in a steering angle input of the vehicle, such approaches are reactive (e.g., they react once a turn is in progress) and do not attempt to proactively predict turns and adjust a vehicle's speed or acceleration before a turn begins.

One or more embodiments described herein address these and other shortcomings by limiting vehicle acceleration (e.g., limit lateral acceleration to a comfortable level for the driver) during turns. More particularly, one or more embodiments described herein implements a full speed range adaptive cruise control (FSRACC) engine, which detects when a driver of a vehicle is about to execute a turn at an intersection or negotiate a roundabout with or without a lead vehicle. When it is detected that a turn is about to be performed, and if the lead vehicle "disappears" or is no longer sensed, one or more embodiments described herein reduce a vehicle's acceleration by appropriately limiting the acceleration until the maneuver (e.g., turn) is completed. The FSRACC engine uses vehicle movement data (e.g., data from a GPS unit of the vehicle, data from an inertial measurement unit of the vehicle, and/or the like, including combinations and/or multiples thereof) as input to determine the location of the vehicle and predict whether a turn is about to be performed. One or more embodiments described herein can monitor a vehicle's turn signals to determine a driver's intent to make a turn. If the vehicle is determined to be in a turn lane with an active turn signal or entering a roundabout, for example, the vehicle is considered to be about to make a turn, and the FSRACC engine limits the acceleration of the vehicle during the turn. Once the turn is completed, the acceleration rate for the vehicle returns to normal (e.g., a default acceleration limit). The completion of the turn can be determined, for example, by an inactive turn signal, by vehicle movement data (e.g., IMU data, GPS data), and no imminent next turn based on map data.

It should be appreciated that the functioning of a vehicle implementing one or more of the embodiments described herein is improved. For example, ride quality of a vehicle is drastically improved by limiting acceleration during turns. When acceleration is not limited during turns, the forces exerted on the vehicle (and its passengers) greatly exceeds the forces exerted on the vehicle when the vehicle's acceleration during a turn is limited. This reduces wear and tear on the vehicle, improves ride quality, among other benefits.

FIG. 1 is an illustration of a vehicle 100 having a processing system 102 for limiting vehicle acceleration during turns according to one or more embodiments. The vehicle 100 can be a car, a truck, a van, a bus, a motorcycle, a boat, or any other type of automobile. According to an embodiment, the vehicle 100 includes an internal combustion engine fueled by gasoline, diesel, or the like. According to another embodiment, the vehicle 100 is a hybrid electric vehicle partially or wholly powered by electrical power. According to another embodiment, the vehicle 100 is an electric vehicle powered by electrical power. According to one or more embodiments, the vehicle 100 is an autonomous or semi-autonomous vehicle. An autonomous vehicle is a vehicle that has self-driving capabilities.

According to one or more embodiments, the vehicle 100 includes the processing system 102. The processing system 102 can use map data, for example, to limit vehicle acceleration during turns. Further features of the processing system 102 are now described with reference to FIGS. 2-4.

Figure 2:
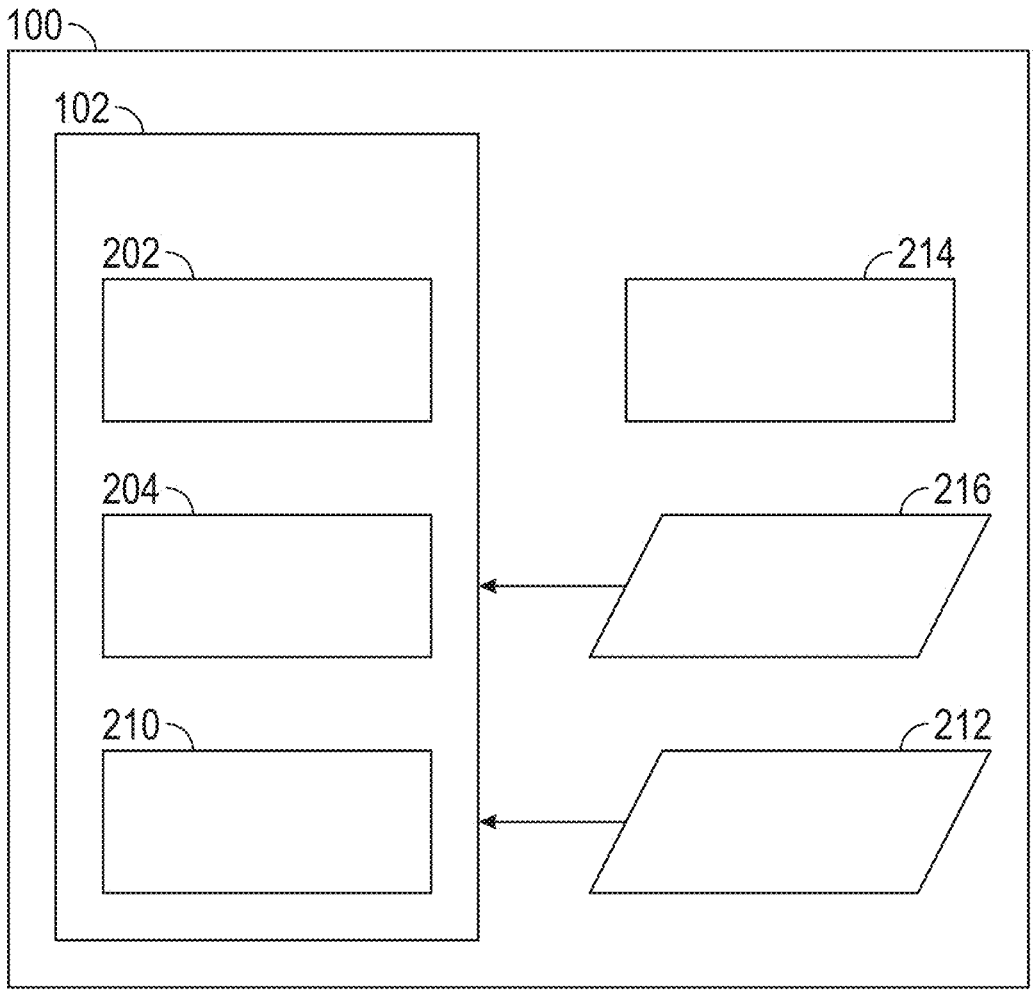
FIG. 2 is a block diagram of the processing system of FIG. 1 for limiting vehicle acceleration during turns according to one or more embodiments.

Particularly, FIG. 2 is a block diagram of the processing system 102 of FIG. 1 for limiting vehicle acceleration during turns according to one or more embodiments. The processing system 102 includes a processing device 202, a memory 204, and a full speed range adaptive cruise control (FSRACC) engine 210. It should be appreciated that the processing system 102 can be any device suitable for performing battery state health estimation. For example, the processing system 102 can be a device implemented in or otherwise associated with the vehicle 100. As another example, the processing system 102 can be a smartphone, tablet computer, laptop computer, desktop computer, wearable computing device, and/or the like, including combinations and/or multiples thereof.

The processing device 202 is any suitable processing circuitry for processing data and/or instructions. The processing device 202 is an example of one or more of the processing devices 521 of FIG. 5, as described in more detail herein.

The memory 204 is any suitable device for storing data and/or instructions. The memory 204 is an example of one or more of the system memory 522, the random access memory 523, and/or the read-only memory 524 of FIG. 5, as described in more detail herein.

The FSRACC engine 210 calculates an acceleration limit for the vehicle 100 that is used during turns to limit the acceleration of the vehicle 100, as described in more detail herein. The vehicle 100 can be controlled during the turn using the acceleration limit. According to one or more embodiments, the FSRACC engine 210 uses map data 212 to determine whether the vehicle 100 is about to begin a turn. According to one or more embodiments, the vehicle 100 includes an inertial measurement unit (IMU) 214 that generates vehicle movement data 216 (also referred to as "IMU data"). The vehicle movement data 216 can, additionally or alternatively, be generated by other sources, such as a GPS module. The vehicle movement data 216 can be used to predict whether the vehicle 100 is about to begin a turn and/or to identify when a turn has been completed.

Further aspects and features of the FSRACC engine 210 are described herein with respect to FIGS. 3, 4A, 4B, and 5.

The various components, modules, engines, etc. described regarding FIG. 2 (e.g., the FSRACC engine 210) can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 202 for executing those instructions. Thus, a system memory (e.g., memory 204) can store program instructions that, when executed by the processing device 202, implement the engines described herein. Other engines can also be utilized to include other features and functionality described in other examples herein.

Figure 3:
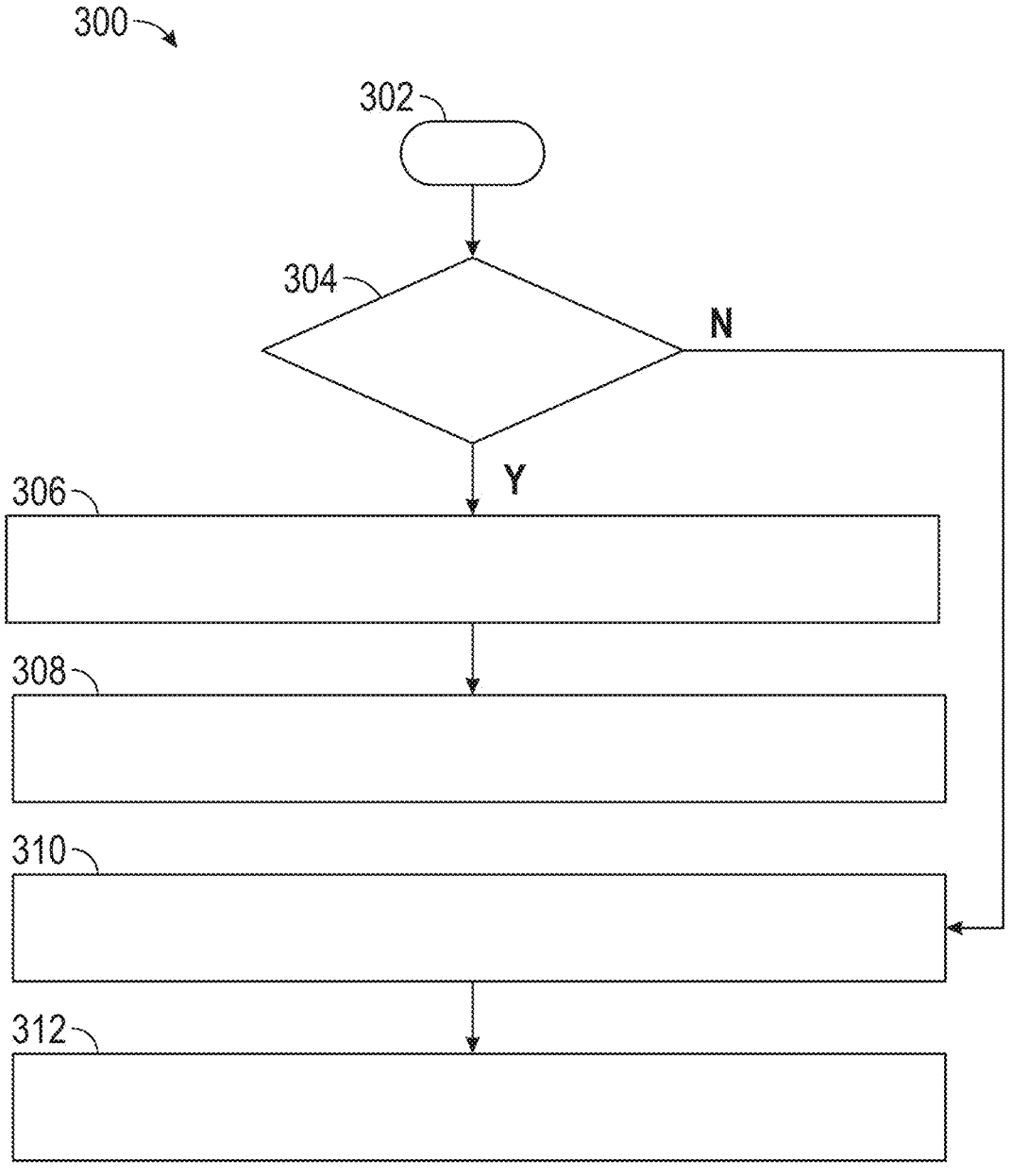
FIG. 3 is a flow diagram of a method for limiting vehicle acceleration during turns according to one or more embodiments.

FIG. 3 is a flow diagram of a method 300 for limiting vehicle acceleration during turns according to one or more embodiments. The method 300 can be implemented using any suitable system or device. For example, the method 300 can be implemented using the processing system 102 of FIGS. 1 and 2, by the processing system 500 of FIG. 5, and/or the like, including combinations and/or multiples thereof. The method 300 is now described with reference to FIGS. 1 and 2 but is not so limited.

The method 300 begins at block 302 and proceeds to block 304. At block 304, the processing system 102 (e.g., using the FSRACC engine 210) determines whether the vehicle 100 is about to begin a turn before the vehicle 100 begins the turn. The FSRACC engine 210 can predict whether the vehicle 100 is about to begin a turn based on the map data 212 and/or the vehicle movement data 216, for example. According to one or more embodiments, if the vehicle 100 is traveling at a speed above a threshold speed (e.g., 35 miles per hour), it may be determined that the vehicle 100 is not about to make a turn. Other speed thresholds can be used in other examples. If the vehicle 100 is stopped or moving slowly (e.g., the vehicle 100 is traveling at a speed less than 5 miles per hour) as determined by the vehicle movement data 216 and the vehicle 100 is in a turn lane of the road as determined using the map data 212, the FSRACC engine 210 may determine that the vehicle 100 is about to make a turn (even though the vehicle 100 has not yet begun to turn).

If it is determined that the vehicle 100 is about to begin a turn (block 304 "Yes"), the method 300 proceeds to block 306. At block 306, responsive to determining that the vehicle 100 is about to begin the turn before the vehicle 100 begins the turn, the processing system 102 (e.g., using the FSRACC engine 210) calculates an acceleration limit for the vehicle 100 during the turn based at least in part on map data 212 associated with the turn. The acceleration limit is a maximum amount of lateral acceleration that is allowed. The acceleration limit can be calculated based on a curvature of an expected turn and a velocity of the vehicle 100. For example, the map data 212 can indicate a curvature (k) of a turn that the vehicle 100 is expected to make. The curvature (k) can also be expressed as the inverse of the radius of the turn (1/radius). The vehicle movement data 216 can indicate the longitudinal velocity (Vx) of the vehicle 100. The curvature and velocity values can be used to calculate the lateral acceleration limit (Ay) using the following formula, for example:

$$Ay = Vx^2 * k.$$

According to one or more embodiments, for driver comfort, the lateral acceleration (Ay) may be limited to a certain maximum value, which may vary by speed. As an example, at relatively lower speeds, the maximum value for lateral acceleration (MaxAy) may be substantially 3 m/s², while at relatively higher speeds, the maximum value for lateral acceleration (MaxAy) may be lower, such as substantially 2 m/s². The lateral acceleration (Ay) can then be replaced with a maximum value for lateral acceleration (MaxAy), which is constant. A maximum longitudinal velocity can then be calculated as follows:

$$MaxVx = \sqrt{\frac{MaxAy}{k}}.$$

The longitudinal acceleration command (AxCmnd) can be calculated as a control on the error of (Vx) and (MaxVx), such as:

$$AxCmnd = (P(MaxVx - Vx)),$$

where P maybe a function of MaxAy, Ay, Vx, and MaxVx, which represents a proportional control but could be a proportional-integral-derivative (PID) control, a model predictive control (MPC) control, and/or any other control approach that involves a feedback error.

A maximum limit for the longitudinal command (MaxAxCmnd) is calculated based on the acceleration limit (MaxAy) to limit the longitudinal acceleration for driver comfort and performance whether a turn is present or not, as follows:

$$AxCmnd = \min(AxCmnd, MaxAxCmnd) \text{ where } MaxAxCmnd = f(MaxAy).$$

According to one or more embodiments, the acceleration limit (Ay) can be calculated using a turn type calculation table. A turn type calculation table indicates parameters (e.g., curvature/radius, velocity, lane width, etc.) for different types of turns at intersections or other roadway junctions. The turn type calculation table can also be used to set the value for the MaxAy. These parameters can be used to determine a suitable acceleration limit. This approach is useful where the map data 212 indicates that a turn is present but the map data 212 does not include curvature information. In such cases, the curvature can be estimated from the turn type calculation table based on the type of turn (e.g., a 90 degree turn at an intersection, a merge, and/or the like, including combinations and/or multiples thereof), and the estimated curvature can be used to calculate the acceleration limit according to the equation defined above. According to one or more embodiments, the turn type calculation table indicates the value for curvature (k).

According to one or more embodiments, where the curvature information is not available from the map data 212 or from a turn type calculation table, a default acceleration limit may be implemented.

At block 308, the vehicle 100 is controlled during the turn using the acceleration limit from block 306. That is, the vehicle 100 is prevented from acceleration beyond the limit defined by the acceleration limit during the turn. The FSRACC engine 210 can control the acceleration of the vehicle 100 using the acceleration limit.

If it is determined that the vehicle 100 is not about to begin a turn (block 302 "No"), the method 300 proceeds to block 310. At block 310, the processing system 102 (e.g., using the FSRACC engine 210) sets the acceleration limit for the vehicle 100 to a default acceleration limit. Even in situations where the vehicle 100 is not turning, it may be desirable to limit acceleration to improve vehicle performance and ride quality. For example, a default acceleration limit represents an acceleration limit that applies to the vehicle 100 regardless of the operating state of the vehicle 100 and acts to improve vehicle performance and ride quality. At block 312, the method 300 includes controlling the vehicle 100 based at least in part on the default acceleration limit. The FSRACC engine 210 can control the acceleration of the vehicle 100 using the default acceleration limit. It should be appreciated that, according to one or more embodiments, the default acceleration limit is generally greater than the acceleration limit during a turn. As a non-limiting example, the default acceleration limit may be substantially 4 meters/second² (m/s²), while during a turn, the acceleration limit may be substantially 1 m/s².

According to one or more embodiments, the method 300 can include determining (e.g., by the FSRACC engine 210) whether a turn signal of the vehicle is engaged. Where a driver has engaged a turn signal, it is more likely that the vehicle 100 is about to make a turn. In such cases, responsive to determining that the turn signal of the vehicle 100 is engaged, the acceleration limit can be modified for the vehicle by reducing the acceleration limit (e.g., by the FSRACC engine 210). Since the confidence of the turn increases, the acceleration limit may be further reduced when the turn signal is enabled. If, however, the turn signal is not engaged, the confidence of the turn decreases. In such cases, responsive to determining that the turn signal of the vehicle is not engaged, the acceleration limit for the vehicle 100 may be reset to a default acceleration limit (e.g., by the FSRACC engine 210).

According to one or more embodiments, the method 300 incudes determining (e.g., by the FSRACC engine 210) whether a target vehicle is in proximity to the vehicle and in front of the vehicle 100. A target vehicle is a vehicle other than the vehicle 100, which may be near the vehicle 100. The target vehicle is considered to be in proximity to the vehicle 100 when the target vehicle and the vehicle 100 are within a threshold distance (e.g., 50 feet, 100 feet, 25 yards, 40 meters, and/or the like, including combinations and/or multiples thereof). The target vehicle is considered to be in front of the vehicle 100 when the target vehicle is in the same lane of travel as the vehicle 100 and is in a forward direction relative to the vehicle 100, for example. Responsive to determining that the target vehicle is in proximity to the vehicle 100 and in front of the vehicle 100, the acceleration limit may be modified (e.g., by the FSRACC engine 210) for the vehicle 100 by reducing the acceleration limit based at least in part on a distance to the target vehicle and a speed of the target vehicle. That is, the acceleration limit is further reduced based on the target vehicle's distance from the vehicle 100 and the target vehicle's speed in order to prevent the vehicle 100 from overtaking the target vehicle, which may cause a collision.

According to one or more embodiments, the FSRACC engine 210 can use the vehicle movement data 216 to determine whether the turn is complete. For example, if the vehicle 100 begins traveling in a straight line, the turn may be considered to be complete. Responsive to determining that the turn is complete, the FSRACC engine 210 can reset the acceleration limit for the vehicle 100 to the default acceleration limit. According to one or more embodiments, if a second turn is expected to be performed shortly after a first turn (e.g., within a threshold period of time (e.g., 7 seconds) or within a threshold distance (e.g., 100 yards)), the FSRACC engine 210 may maintain the acceleration limit without resetting the acceleration limit to the default acceleration limit even though a first turn was completed.

Additional processes also may be included, and it should be understood that the processes depicted in FIG. 3 represent illustrations, and that other processes may be added, or existing processes may be removed, modified, or rearranged without departing from the scope of the present disclosure. It should also be understood that the processes depicted in FIG. 3 may be implemented as programmatic instructions stored on a non-transitory computer-readable storage medium that, when executed by a processor (e.g., the processing device 202 of FIG. 2, the processor(s) 521 of FIG. 5, and/or the like, including combinations and/or multiples thereof) of a computing system (e.g., the processing system 102 of FIGS. 1 and 2, the processing system 500 of FIG. 5, and/or the like, including combinations and/or multiples thereof), cause the processor to perform the processes described herein.

Figure 4:
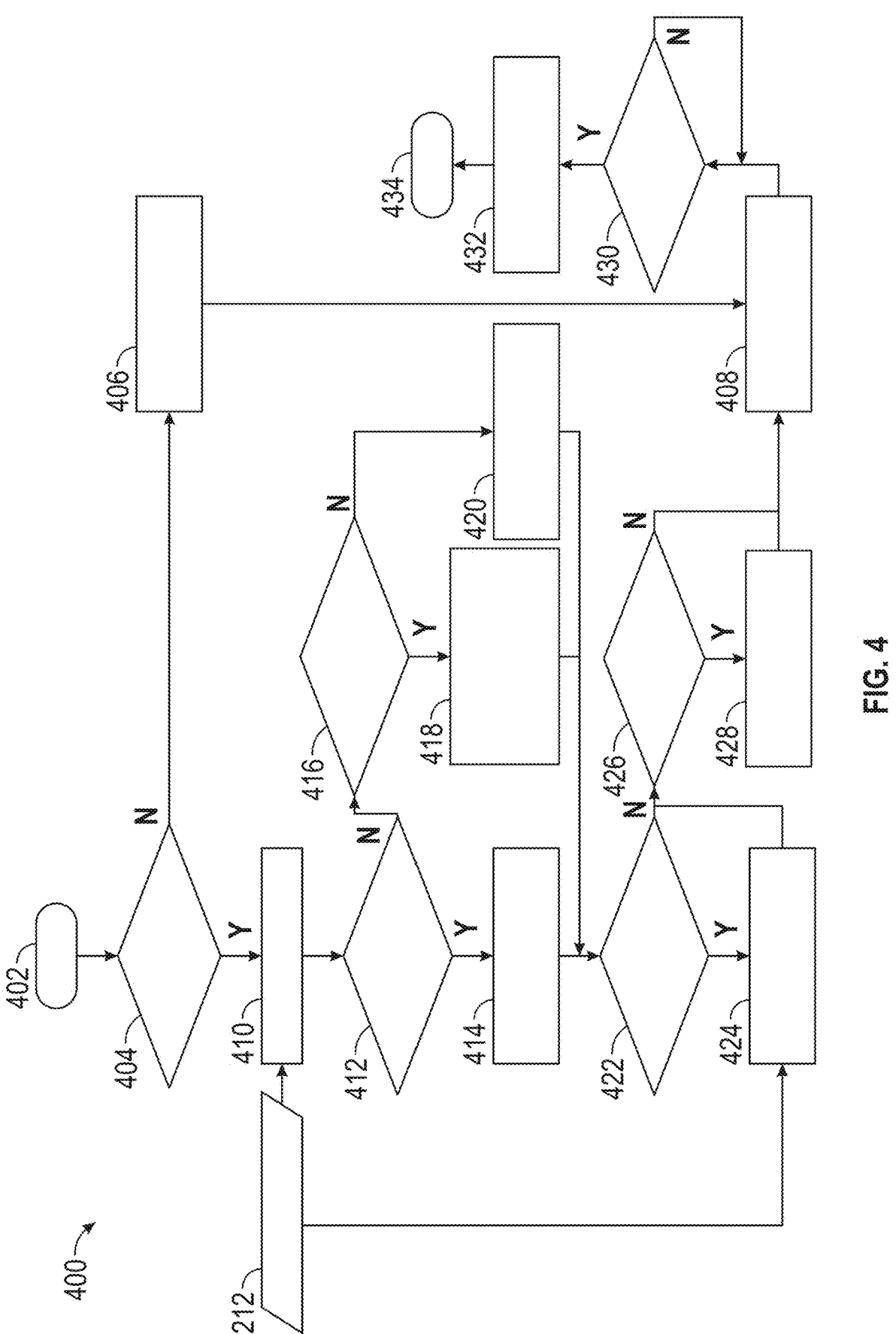
FIG. 4 is a flow diagram of a method for limiting vehicle acceleration during turns according to one or more embodiments.

FIG. 4 is a flow diagram of a method 400 for limiting vehicle acceleration during turns according to one or more embodiments. The method 400 can be implemented using any suitable system or device. For example, the method 400 can be implemented using the processing system 102 of FIGS. 1 and 2, by the processing system 500 of FIG. 5, and/or the like, including combinations and/or multiples thereof. The method 400 is now described with reference to FIGS. 1 and 2 but is not so limited.

The method 400 begins at block 402 and proceeds to block 404. At block 404, the processing system 102 (e.g., using the FSRACC engine 210) determines whether the vehicle 100 is stopped. The determination at block 404 can be made using the vehicle movement data 216 (e.g., from the inertial measurement unit 214), for example, which may indicate whether the vehicle is moving or stopped. If the vehicle is not stopped (block 404 "No"), the method 400 proceeds to block 406 where no turn limit is set because the vehicle 100 is not stopped. According to one or more embodiments, at block 406, the method 400 may set a default acceleration limit as described herein. The method 400 proceeds to block 408 where the default acceleration limit is set.

If, at block 404, it is determined that that the vehicle 100 is not stopped (block 404 "Yes"), the method 400 proceeds to block 410, where the map data 212 is received. The map data 212 can be preloaded on the vehicle 100, can be received from a third-party source via a communication link (e.g., from a cloud computing environment via the internet), from a device associated with a user/operator of the vehicle, and/or the like, including combinations and/or multiples thereof. It should be appreciated that the map data 212 can be received from any suitable source.

At block 412, it is determined whether the map data 212 indicates that curvature information (k) is provided for an expected turn. If it is determined that the curvature (k) is present (block 412 "Yes"), the FSRACC engine 210 calculates an acceleration limit (e.g., a lateral acceleration limit) (MaxAyz→AxCmnd) based on the curvature (k) of the turn as defined by the map data 212 and the velocity of the vehicle 100 as defined by the vehicle movement data 216, as described herein. However, if the map data 212 does not indicate curvature information (block 412 "No"), the method 400 proceeds to block 416 where it is determined whether the map data 212 indicates that a turn is expected. If so (block 416 "Yes"), the FSRACC engine 210 calculates, at block 418, the acceleration limit (e.g., a lateral acceleration limit) (MaxAy→AxCmnd) based on a type of the turn as determined using a turn type calculation table 420 as described herein. However, if no turn is indicated on a map (block 416 "No"), a default acceleration limit for turns (e.g., 1 m/s²) is set. Once the acceleration limit is calculated or set (blocks 414, 418, or block 420).

The method 400 then proceeds to block 422, where the FSRACC engine 210 determines whether a turn signal is engaged. The turn signal can be used as a validation of the estimation that a turn is about to be completed. If a turn signal is engaged (block 422 "Yes"), at block 424, the acceleration limit can be modified, such as further reduced, because it is assumed that a turn is going to occur. If no turn signal is engaged (block 422 "No"), the method 400 proceeds to block 426.

At block 426, the FSRACC engine 210 determines whether a vehicle is ahead of the vehicle 100. Where it is determined that there is a vehicle ahead of the vehicle 100 (block 426 "Yes"), the FSRACC engine 210 may further limit the acceleration limit to allow for headway for the vehicle ahead of the vehicle 100 at block 428. This ensures that the vehicle 100 does not accelerate fast enough to encounter the vehicle ahead of the vehicle 100. That is, an acceleration limit based on the vehicle ahead of the vehicle 100 may override the acceleration limit from blocks 414, 418, or 420 for the turn. If it is determined that there is no vehicle ahead of the vehicle 100 (block 426 "No"), the method 400 proceeds to block 408, where the acceleration limit for the turn is set.

The method 400 then proceeds to block 430, where the FSRACC engine 210 determines whether the turn is complete. If not (block 430 "No"), the vehicle 100 continues to operate with the acceleration limit set at block 408. However, if it is determined that the turn is complete (block 430 "Yes"), the acceleration limit can be reset to a default acceleration limit. Once the default acceleration limit is set at block 432, the method 400 proceeds to block 434 and ends. However, according to one or more embodiments, the method 400 can repeat by returning to block 404 for additional turn(s).

Additional processes also may be included, and it should be understood that the processes depicted in FIG. 4 represent illustrations, and that other processes may be added, or existing processes may be removed, modified, or rearranged without departing from the scope of the present disclosure. It should also be understood that the processes depicted in FIG. 3 may be implemented as programmatic instructions stored on a non-transitory computer-readable storage medium that, when executed by a processor (e.g., the processing device 202 of FIG. 2, the processor(s) 521 of FIG. 5, and/or the like, including combinations and/or multiples thereof) of a computing system (e.g., the processing system 102 of FIGS. 1 and 2, the processing system 500 of FIG. 5, and/or the like, including combinations and/or multiples thereof), cause the processor to perform the processes described herein.

Figure 5:
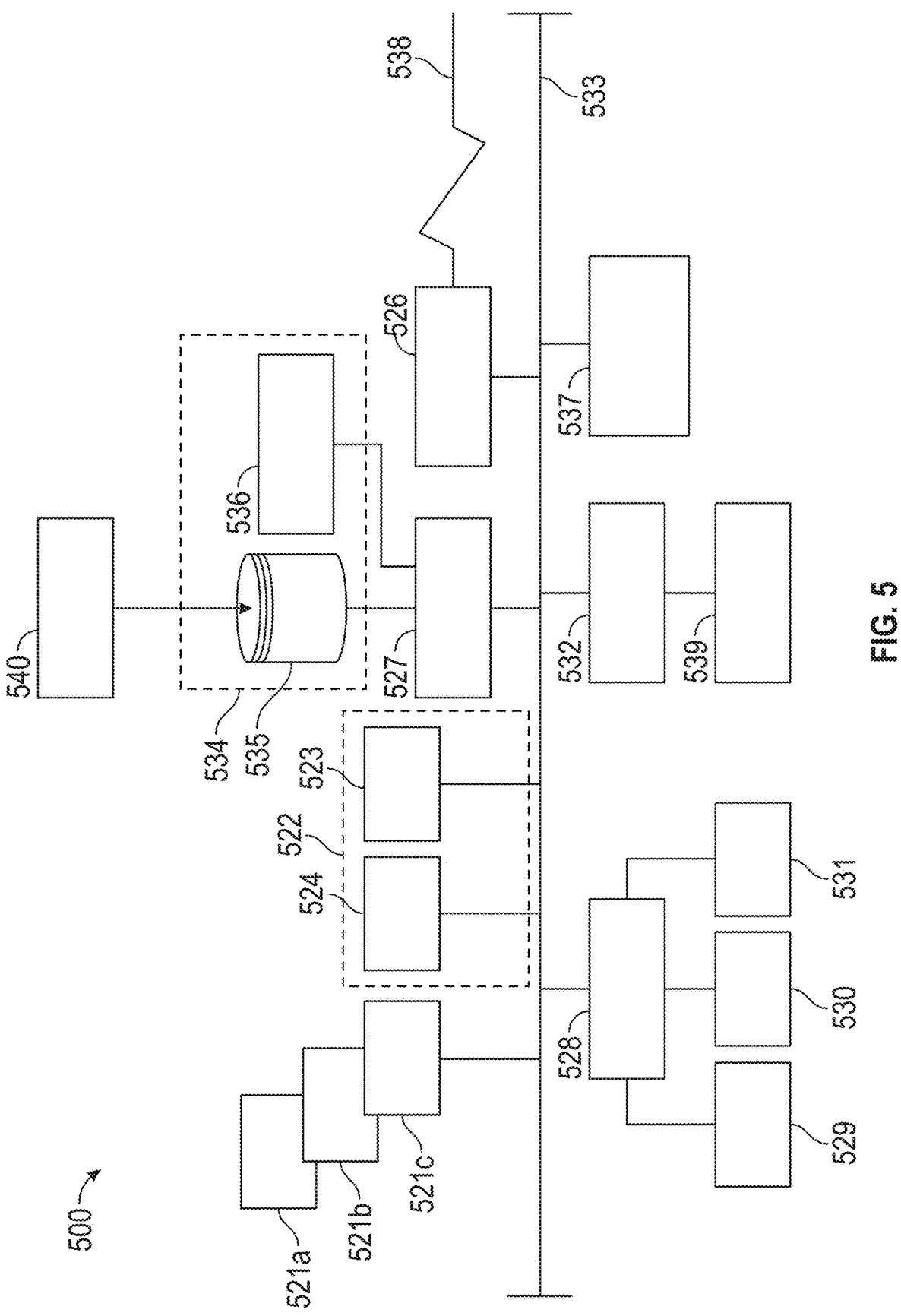
FIG. 5 is a block diagram of a processing system for implementing one or more embodiments described herein.

It is understood that one or more embodiments described herein is capable of being implemented in conjunction with any other type of computing environment now known or later developed. For example, FIG. 5 depicts a block diagram of a processing system 500 for implementing the techniques described herein. In accordance with one or more embodiments described herein, the processing system 500 is an example of a cloud computing node of a cloud computing environment. In examples, processing system 500 has one or more central processing units (referred to also as "processors" or "processing resources" or "processing devices") 521*a*, 521*b*, 521*c*, etc. (collectively or generically referred to as processor(s) 521 and/or as processing device(s) 521). In aspects of the present disclosure, each processor 521 can include a reduced instruction set computer (RISC) microprocessor. Processors 521 are coupled to a system memory 522 and/or various other components via a system bus 533. The system memory 522 can include one or more temporary and/or persistent memory devices, such as a random access memory (RAM) 523, a read-only memory (ROM) 524, and/or the like, including combinations and/or multiples thereof. The system bus 533 may include a basic input/output system (BIOS), which controls certain basic functions of processing system 500.

Further depicted are an input/output (I/O) adapter 527 and a network adapter 526 coupled to system bus 533. I/O adapter 527 may be a small computer system interface (SCSI) adapter that communicates with a hard disk 535 and/or a storage device 536 or any other similar component. I/O adapter 527, hard disk 535, and storage device 536 are collectively referred to herein as mass storage 534. Operating system 540 for execution on processing system 500 may be stored in mass storage 534. The network adapter 526 interconnects system bus 533 with an outside network 538 enabling processing system 500 to communicate with other such systems.

A display (e.g., a display monitor) 539 is connected to system bus 533 by display adapter 532, which may include a graphics adapter to improve the performance of graphics intensive applications and a video controller. In one aspect of the present disclosure, adapters 526, 527, and/or 532 may be connected to one or more I/O buses that are connected to system bus 533 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via user interface adapter 528 and display adapter 532. A keyboard 529, mouse 530, and speaker 531 may be interconnected to system bus 533 via user interface adapter 528, which may include, for example, a Super I/O chip integrating multiple device adapters into a single integrated circuit.

In some aspects of the present disclosure, processing system 500 includes a graphics processing unit (GPU) 537. Graphics processing unit 537 is a specialized electronic circuit designed to manipulate and alter memory to accelerate the creation of images in a frame buffer intended for output to a display. In general, graphics processing unit 537 is very efficient at manipulating computer graphics and image processing and has a highly parallel structure that makes it more effective than general-purpose CPUs for algorithms where processing of large blocks of data is done in parallel.

Thus, as configured herein, processing system 500 includes processing capability in the form of processors 521, storage capability including the system memory 522 and mass storage 534, input means such as keyboard 525 and mouse 530, and output capability including speaker 531 and display 539. In some aspects of the present disclosure, a portion of system memory 522 and mass storage 534 collectively store the operating system 540 to coordinate the functions of the various components shown in processing system 500.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer-implemented method for limiting vehicle acceleration during turns for a vehicle, the method comprising:

determining whether the vehicle is about to begin a turn before the vehicle begins the turn;

responsive to determining that the vehicle is about to begin the turn before the vehicle begins the turn, calculating an acceleration limit for the vehicle during the turn based at least in part on map data associated with the turn;

controlling the vehicle during the turn based at least in part on the acceleration limit;

determining whether a turn signal of the vehicle is engaged; and responsive to determining that the turn signal of the vehicle is engaged, performing at least one of:

modifying the acceleration limit for the vehicle by reducing the acceleration limit, or implementing the acceleration limit for the vehicle during the turn.

2. The computer-implemented method of claim 1, further comprising:

responsive to determining that the turn signal of the vehicle is not engaged, resetting the acceleration limit for the vehicle to a default acceleration limit.

3. The computer-implemented method of claim 1, further comprising:

determining whether a target vehicle is in proximity to the vehicle and in front of the vehicle; and responsive to determining that the target vehicle is in proximity to the vehicle and in front of the vehicle, modifying the acceleration limit for the vehicle by reducing the acceleration limit based at least in part on a distance to the target vehicle and a speed of the target vehicle.

4. The computer-implemented method of claim 3, further comprising, responsive to determining that the target vehicle is in proximity to the vehicle or is not in front of the vehicle, implementing the acceleration limit for the vehicle during the turn.

5. The computer-implemented method of claim 1, further comprising:

determining whether the turn is complete; and responsive to determining that the turn is complete, resetting the acceleration limit for the vehicle to a default acceleration limit.

6. The computer-implemented method of claim 5, wherein determining whether the turn is complete is based at least in part on movement data received from an inertial measurement unit of the vehicle.

7. The computer-implemented method of claim 1, wherein the map data indicates a curvature of the turn.

8. The computer-implemented method of claim 7, wherein calculating the acceleration limit is based at least in part on the curvature of the turn and a square of a velocity of the vehicle.

9. The computer-implemented method of claim 7, further comprising, responsive to determining that the vehicle is not about to begin the turn, setting the acceleration limit for the vehicle to a default acceleration limit.

10. A vehicle comprising:

an inertial measurement unit to generate movement data for the vehicle; and a processing system, the processing system comprising:

a memory comprising computer readable instructions; and a processing device for executing the computer readable instructions, the computer readable instructions controlling the processing device to perform operations for limiting vehicle acceleration during turns, the operations comprising:

determining whether a vehicle is about to begin a turn before the vehicle begins the turn;

responsive to determining that the vehicle is about to begin the turn before the vehicle begins the turn, calculating an acceleration limit for the vehicle during the turn based at least in part on map data associated with the turn, wherein the map data indicates a curvature of the turn;

controlling the vehicle during the turn based at least in part on the acceleration limit;

determining, based at least in part on the movement data for the vehicle, whether the turn is complete; and responsive to determining that the turn is complete, resetting the acceleration limit for the vehicle to a default acceleration limit.

11. The vehicle of claim 10, wherein the operations further comprise:

determining whether a turn signal of the vehicle is engaged; and responsive to determining that the turn signal of the vehicle is engaged, modifying the acceleration limit for the vehicle by reducing the acceleration limit.

12. The vehicle of claim 10, wherein the operations further comprise:

determining whether a turn signal of the vehicle is engaged;

responsive to determining that the turn signal of the vehicle is engaged, implementing the acceleration limit for the vehicle during the turn; and responsive to determining that the turn signal of the vehicle is not engaged, resetting the acceleration limit for the vehicle to the default acceleration limit.

13. The vehicle of claim 10, wherein the operations further comprise:

determining whether a target vehicle is in proximity to the vehicle and in front of the vehicle; and responsive to determining that the target vehicle is in proximity to the vehicle and in front of the vehicle, modifying the acceleration limit for the vehicle by reducing the acceleration limit based at least in part on a distance to the target vehicle and a speed of the target vehicle.

14. The vehicle of claim 13, wherein the operations further comprise, responsive to determining that the target vehicle is in proximity to the vehicle or is not in front of the vehicle, implementing the acceleration limit for the vehicle during the turn.

15. The vehicle of claim 10, wherein calculating the acceleration limit is based at least in part on the curvature of the turn and a square of a velocity of the vehicle.

16. The vehicle of claim 10, wherein the operations further comprise, responsive to determining that the vehicle is not about to begin the turn, setting the acceleration limit for the vehicle to the default acceleration limit.

17. A computer program product comprising a computer readable storage medium having program instructions embodied therewith, the program instructions executable by at least one processor to cause the at least one processor to perform operations comprising:

determining whether a vehicle is about to begin a turn before the vehicle begins the turn; and responsive to determining that the vehicle is about to begin the turn before the vehicle begins the turn, calculating an acceleration limit for the vehicle during the turn based at least in part on map data associated with the turn, the map data indicating a curvature of the turn, the acceleration limit being calculated based at least in part on the curvature of the turn and a square of a velocity of the vehicle;

controlling the vehicle during the turn based at least in part on the acceleration limit;

determining, based at least in part on movement data for the vehicle, whether the turn is complete, the movement data being received from an inertial measurement unit of the vehicle; and responsive to determining that the turn is complete, resetting the acceleration limit for the vehicle to a default acceleration limit.

18. The computer program product of claim 17, the operations further comprising:

determining whether a turn signal of the vehicle is engaged; and responsive to determining that the turn signal of the vehicle is not engaged, resetting the acceleration limit for the vehicle to the default acceleration limit.

19. The computer program product of claim 17, the operations further comprising determining whether a target vehicle is in proximity to the vehicle and in front of the vehicle.

20. The computer program product of claim 19, the operations further comprising, responsive to determining that the target vehicle is in proximity to the vehicle and in front of the vehicle, modifying the acceleration limit for the vehicle by reducing the acceleration limit based at least in part on a distance to the target vehicle and a speed of the target vehicle.

\* \* \* \* \*